United States Patent [19]

Gibbs

[11] Patent Number: 4,962,651
[45] Date of Patent: Oct. 16, 1990

[54] ANTI-THEFT DEVICE FOR AUTOMOTIVE AUDIO EQUIPMENT

[76] Inventor: Joyce K. Gibbs, 2258 Willow Wood Rd., Grand Junction, Colo. 81503

[21] Appl. No.: 445,351

[22] Filed: Dec. 4, 1989

[51] Int. Cl.⁵ ............................................. E05B 73/00
[52] U.S. Cl. ........................................ 70/58; 411/910
[58] Field of Search ............................ 70/58, 57, 258; 411/389, 910, 405, 403, 307, 263

[56] References Cited

U.S. PATENT DOCUMENTS

| | | | |
|---|---|---|---|
| 1,447,056 | 2/1923 | Bates | 411/307 |
| 1,792,711 | 2/1931 | Rockstad | 411/910 |
| 4,170,918 | 10/1979 | Burge | 411/910 |
| 4,742,702 | 5/1988 | Swertz | 411/910 |

FOREIGN PATENT DOCUMENTS 2169978  7/1986  United Kingdom ................ 411/403

Primary Examiner—Robert L. Wolfe
Attorney, Agent, or Firm—W. Scott Carson

[57] ABSTRACT

A theft prevention device for use on the mounting bolts of automotive audio equipment such as radios and tape players. The device includes a pair of uniquely designed nuts with each nut having an overall shape of a truncated cone with a top, base, and conical exterior surface extending between the top and base. In operation, the first nut of each pair is initially threaded onto one of the bolts of the audio equipment using a special key that mates into a recessed portion in the base of the first nut. The radio or tape player is then manipulated to extend the mounting bolts through holes in the car's dashboard with the planar base of the first nut of each pair facing the interior side of the dashboard. The second nut of each pair is then threaded onto each bolt also using a special key that mates into a recessed portion in the top of each second nut. Once in place, the radio or tape player is securely mounted to the dashboard with the base of the first nut covered to prevent access to its recessed portions to turn it with the special key or any other instrument. Additionally, the only exposed surfaces of the first and second nuts are the tops and inclined, conical sides and none of these surfaces can be effectively gripped with a wrench or other conventional turning tool.

38 Claims, 4 Drawing Sheets

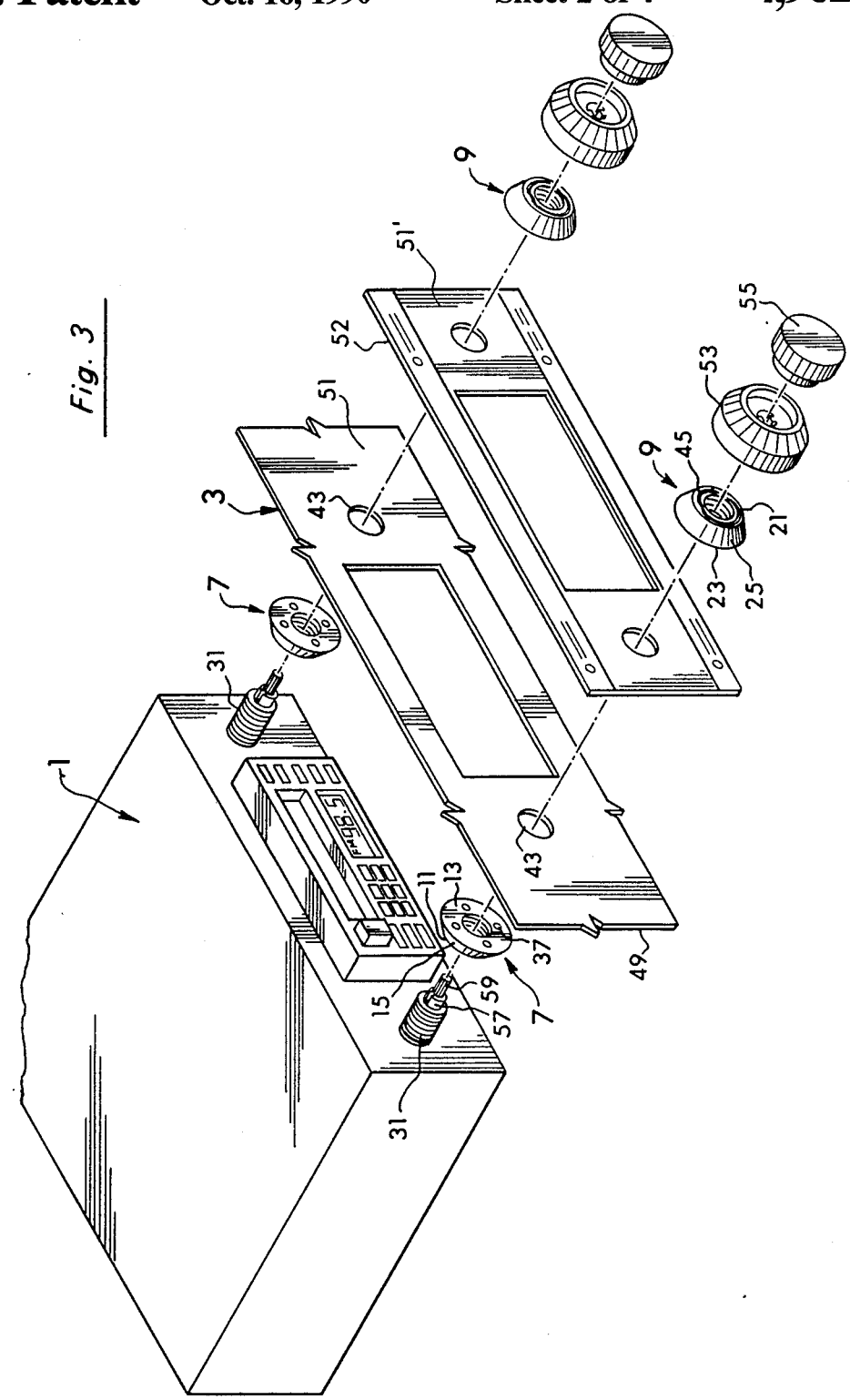

U.S. Patent  Oct. 16, 1990  Sheet 3 of 4  4,962,651
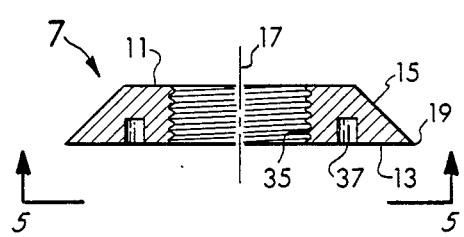
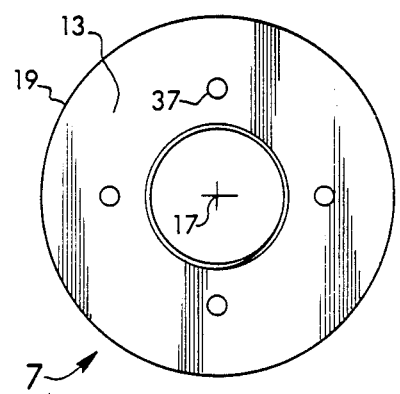
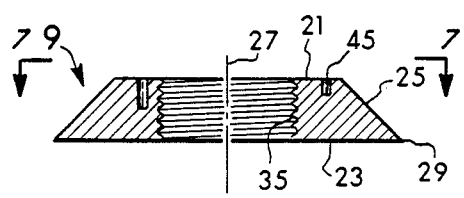
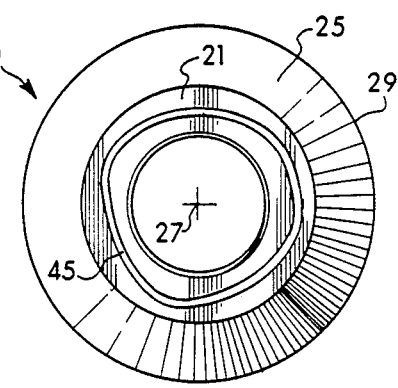
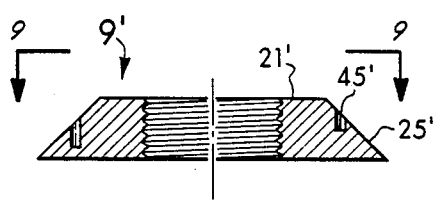
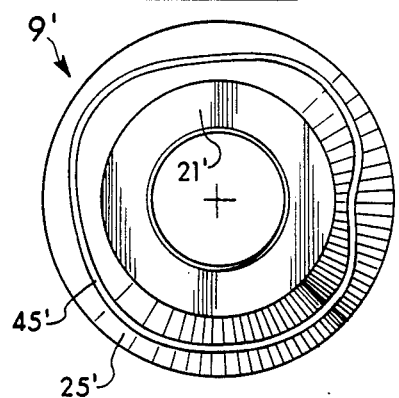

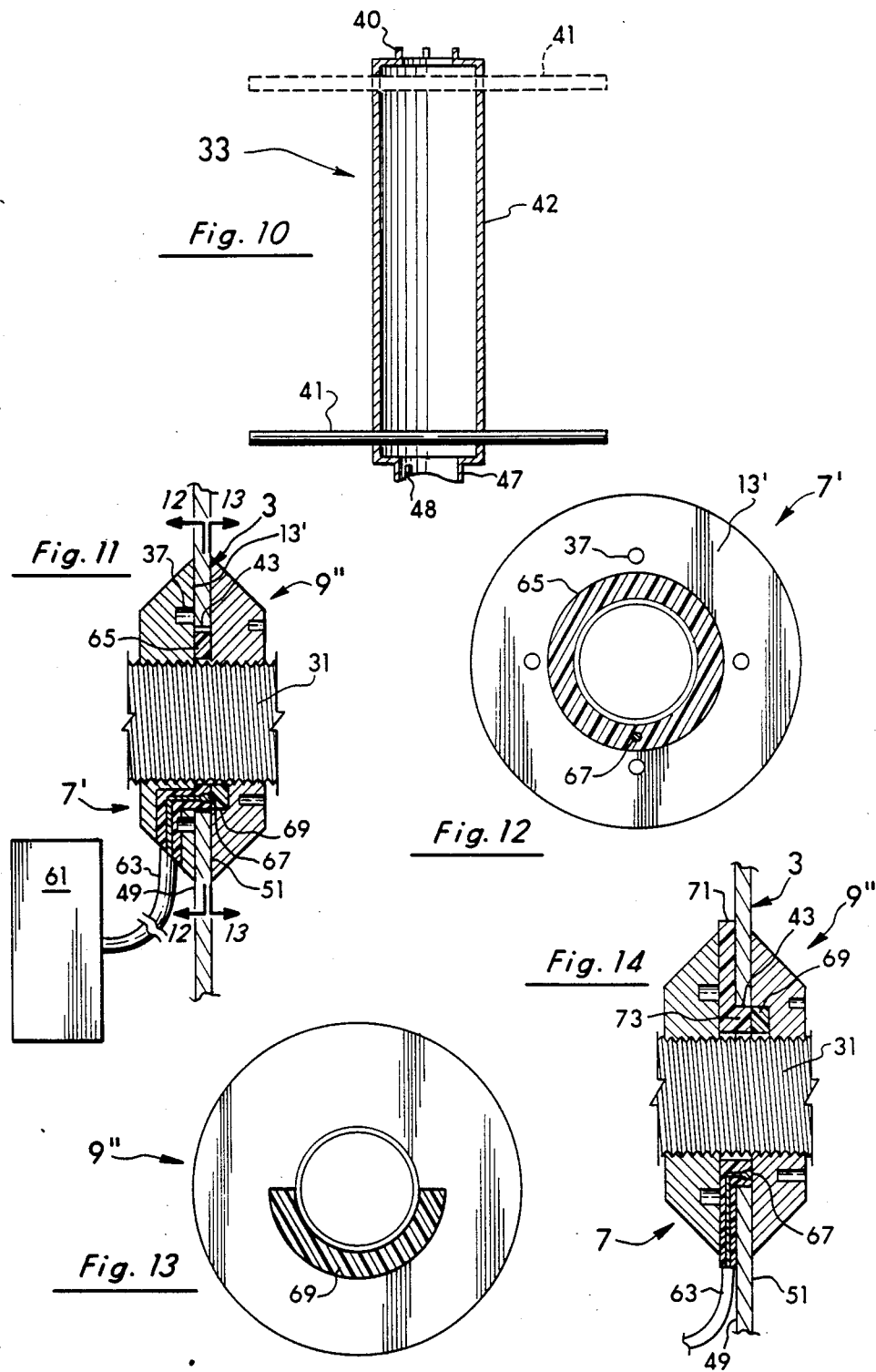

ANTI-THEFT DEVICE FOR AUTOMOTIVE AUDIO EQUIPMENT

BACKGROUND OF THE INVENTION

1. Field of the Invention

This invention relates to the field of theft prevention devices for automotive audio equipment and more particularly, to the field of anti-theft devices for radios and tape players mounted in automobile dashboards.

2. Discussion of the Background

Several security devices for automotive audio equipment such as radios and tape players have been patented. For the most part, these involve arrangements that cover or encase the equipment and arrangements that attempt to disguise or put a false front on it. For example, U.S. Pat. Nos. 4,553,414 to Caputo, 4,248,069 to Burbank, and 3,699,787 to Corrado involve the use of lockable covers that can be secured over the face of the audio equipment. U.S. Pat. No. 4,365,280 to Crosetti varies this covering concept somewhat by using a false front that simply slides into place over the equipment. The false front is made to resemble a cheaper model of radio or tape player and the purpose of the arrangement is simply to disguise or put a false front over the underlying, more expensive equipment in an effort to fool any would be thief. Still other security devices such as U.S. Pat. No. 4,211,995 to Smith are more elaborate and not only encase the equipment in a special container but also wire the container to an electric alarm system.

All of these known security devices certainly will help to deter and to decrease thefts; however, they all have fundamental drawbacks that severely lessen their effectiveness in actual use. For example, the patents of Caputo, Burbank, Corrado, and Crosetti mentioned above all require the use of separate, extra parts and/or keys. In use, the car owner must then physically manipulate these extra parts or keys each time he or she uses the security device. This then presents the additional problem of storing (and not losing) the parts or keys when not in use and the additional task of simply remembering to use the device each time the owner leaves the car not to mention the inconvenience of doing so. Cost is also an important factor as many of these known security devices often involve considerable expense in parts and installation.

In contrast to such prior security devices, the anti-theft arrangement of the present invention offers a simple and inexpensive way to help prevent the theft of automotive audio equipment. With the present invention, the audio equipment can be initially secured in place in the dashboard and thereafter held in place against theft without the need for the owner to lock and unlock the device or manipulate any parts each time he or she wants to leave the car or use the audio equipment.

SUMMARY OF THE INVENTION

This invention involves a theft prevention device for use on the mounting bolts of automotive audio equipment such as radios and tape players. The device includes a pair of uniquely design nuts. Each nut has an overall shape of a truncated cone with a top, base, and conical exterior surface extending between the top and base. Additionally, the threads of each nut are of a different pitch from those of the mounting bolts for the audio equipment and are self-locking on the bolts.

In operation, the first nut of each pair is initially threaded or screwed onto one of the bolts of the audio equipment using a special key that mates into a recessed portion in the base of the first nut. The radio or tape player is then manipulated to extend the mounting bolts through holes in the car's dashboard with the planar base of the first nut of each pair facing the interior side of the dashboard. The second nut of each pair is then threaded onto each bolt also using a special key that mates into a recessed portion in the top of each second nut. Thereafter, each second nut is further tightened to draw the planar base of the first nut into an abutting relationship with the interior side of the dashboard. In doing so, it also draws the planar base of the second nut into an abutting relationship with the exterior side of the dashboard.

The radio or tape player is then securely mounted to the dashboard with the base of the first nut covered to prevent access to its recessed portions to turn it with the special key or any other instrument. Additionally, the only exposed surfaces of the first nut are the top and inclined, conical side and neither one of them can be effectively gripped with a wrench or other conventional turning tool. Similarly, the top and inclined, conical side of the second nut cannot be gripped with any conventional turning tool and the only procedure to unlock the system is to have access to the unique key for the second nut. In this regard and in the preferred embodiments, the keying system involves the use of an elliptical or other non-circular recess or groove in each of the second nuts with the depth of the groove varying wherein not only is the shape of each groove unique to each pair of nuts but also its depth. Consequently, without the special key for the second nut, the theft prevention device of the present invention cannot or at least cannot easily be removed.

BRIEF DESCRIPTION OF THE DRAWINGS

FIG. 3 is an exploded view of the mounting arrangement of FIG. 1.

FIG. 4 is a cross-sectional view of one of the nuts of the present invention.

FIG. 5 is a view taken along line 5—5 of FIG. 4.

FIG. 6 is a cross-sectional view of the other nut of the present invention.

FIG. 7 is a view taken along line 7—7 of FIG. 6.

FIG. 8 is a cross-sectional view of a modified nut in accordance with the present invention.

FIG. 9 is a view taken along line 9—9 of FIG. 8.

FIG. 10 illustrates a turning key specifically designed for use with the nuts of the present invention.

FIG. 11 illustrates a first adaptation of the present invention for use with an electric alarm system.

FIG. 12 is a view taken along line 12—12 of FIG. 11.

FIG. 13 is a view taken along line 13—13 of FIG. 11.

FIG. 14 illustrates a second adaptation of the present invention for us with an electric alarm system.

DETAILED DESCRIPTION OF PREFERRED EMBODIMENTS

Figure 1:
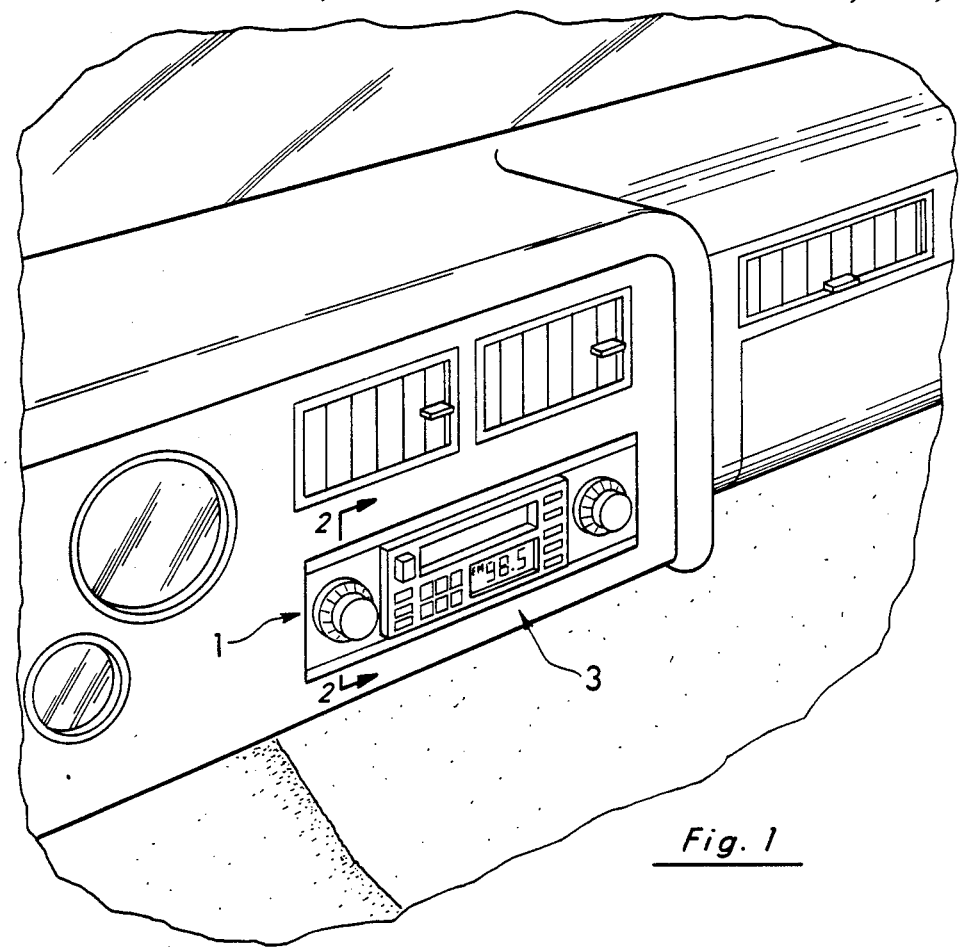
FIG. 1 is a perspective view of an automobile dashboard with a combination radio-tape player in it that uses the theft prevention device of the present invention.

The theft prevention device of the present invention is primarily intended for use with automobile audio equipment such as the combination radio-tape player 1 mounted in the dashboard 3 of the car or other vehicle of FIG. 1. In use as shown in FIG. 1, the anti-theft device is not visible and in no way affects the overall appearance and aesthetics of the audio equipment 1 or the dashboard 3.

The theft prevention device of the present invention consists of two, specially designed nuts 7 and 9 (see FIGS. 2 and 3) which are substituted for the regular hexagonal nuts normally used to mount the radio-tape player 1 in the dashboard 3 of the car or other vehicle. As best seen in FIGS. 4 and 5, the first nut 7 of each pair is in the overall shape of a truncated cone with a planar top 11, annular base 13, and exterior conical surface 15. The exterior conical surface 15 is inclined upwardly in the orientation of FIG. 4 from the planar base 13 to the planar top 11. Additionally, as shown, the exterior conical surface 15 is inclined inwardly toward the axis 17 of the nut 7 and preferably intersects the planar, base surface 13 at an acute angle (e.g., 45 degrees) to form an edge 19. Similarly, the second nut 9 in each pair (see FIGS. 6 and 7) is also in the overall shape of a truncated cone with a planar top 21, annular base 23, and exterior conical surface 25 extending upwardly in the orientation of FIG. 6 from the planar base 23 to the planar top 21. Like the companion nut 7, the exterior conical surface 25 of the second nut 9 additionally is inclined inwardly toward the nut axis 27 and preferably intersects the planar, base surface 23 at an acute angle (e.g., 45 degrees) to form an edge 29.

Figure 2:
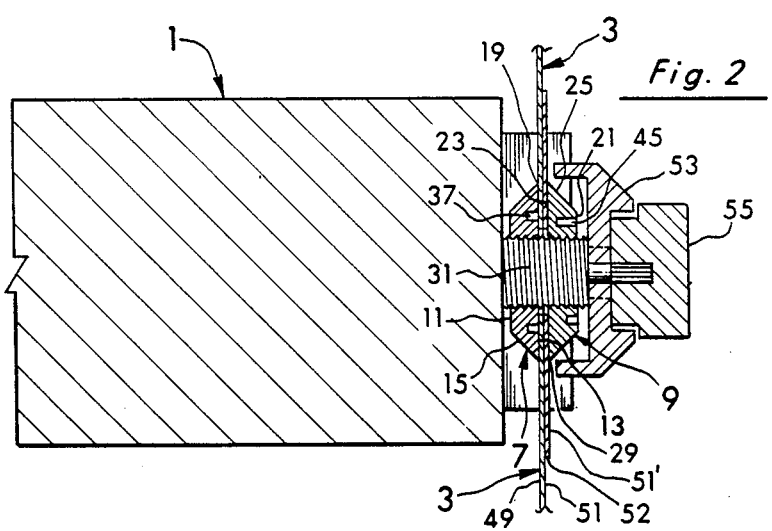
FIG. 2 is a view taken along line 2—2 of FIG. 1.

In use, the first nut 7 of each pair of nuts 7 and 9 is initially screwed onto one of the threaded mounting bolts 31 of the radio-tape player 1 (see FIGS. 2 and 3). This is preferably done using the special key or turning tool 33 of FIG. 10. More specifically, the pitch of the threads 35 of the first nut 7 in the preferred embodiments is different from the pitch of the threaded bolts 31. For example, the pitch of the nut threads 35 could be less (i.e., fewer turns per inch) than those of the bolts 31. In the preferred embodiment, this pitch difference is such that the nut 7 cannot be manually screwed onto the bolts 31 and will require the use of the special key or turning tool 33 to do so. In this light, each nut 7 is provided with a recessed portion in its base 13 which is illustrated in FIGS. 4 and 5 as being four holes 37. These holes 37 can be equally spaced about the axis 17 (see FIG. 5) or can be irregularly spaced if desired. To screw the nut 7 onto the bolt 31 then requires the special key 33 of FIG. 10 with its prongs 40 that match up with the recessed holes 37 in the first nut 7. In doing so, the handle 41 can be inserted through holes in the lower part of the cylinder body 42 of the key 33 for additional turning leverage if desired. This positioning of the handle 41 is shown in solid lines in FIG. 10.

When the first nuts 7 have been screwed onto the bolts 31 to the desired positions with the key 33, the radio-tape player 1 is then manipulated to extend the bolts 31 through the holes 43 into dashboard 3. The second nut 9 in each pair is then respectively screwed onto a threaded bolt 31. Like the first nut 7, the second nut 9 in each pair also has threads 35 of a pitch different from those of bolts 31 wherein the special key or rotating tool 33 is required to screw it into place. In the preferred embodiment, the second nut 9 also has a recessed portion like the first nut 7 but the recessed portion of the second nut 9 is preferably an elliptical or other non-circular groove 45 (see FIGS. 6 and 7) in the top planar surface 21. The key 33 at the lower end in FIG. 10 then has a projection 47 that mates specifically into the groove 45 to turn the nut 9 wherein the key 33 if desired can be turned with the handle 41 of FIG. 10 extending through holes in the top of the key 33 as shown in dotted lines in FIG. 10. For additional security, the groove 45 also may have a varying depth about the axis 27 wherein the projection 47 would then also have a corresponding and mating variance in its height. For further uniqueness and security, the projection 47 could even have a break 48 (see FIG. 10) in it if desired which would align with a mating projection in the groove 45. Like the first nut 7, the second nut 9 is also self-locking on the bolt 31 due to the lesser pitch of its threads 35. Once in place, the conventional control knobs 53 and 55 can then be mounted on the control arms 57 and 59 (see FIG. 3) extending within the bolts 31 of the radio-tape player 1.

As best seen in FIG. 2, each first nut 7 is preferably mounted on the bolt 31 with the planar base 13 of nut 7 facing the planar surface 49 on the interior side of the dashboard 3. In this manner and as the second nut 9 is tightened onto the bolt 31, it will draw the planar base 13 of the first nut 7 into an abutting relationship with the planar surface 49 of the dashboard 3. The holes 37 in the nut 7 will thus be covered preventing access to them with the special tool 33 or any other tool. Additionally, the exterior, conical surface 15 of the nut 7 will prevent the nut 7 from being gripped and turned with a wrench or any other conventional turning tool. Similarly, the second nut 9 at its base 23 will also abut the exterior side of the dashboard 3 against the exterior, planar surface 51' of the dashboard face plate 52 leaving only the exterior, conical surface 25 of the second nut 9 and the top planar surface 21 exposed. Like the top surface 11 and conical side surface 15 of first nut 7, the exposed surfaces 21 and 25 of the second nut 9 also cannot be gripped and turned with a wrench or any conventional turning tool. Consequently, the pair of nuts 7 and 9 in the position of FIG. 2 cannot or at least cannot easily be removed without the special key 33 and will serve as an effective theft prevention device for the audio equipment 1.

While several embodiments of the present invention have been shown and described in detail, it is to be understood that various changes and modifications could be made to them without departing from the scope of the invention. For example, the recessed portions of holes 37 in nut 7 and the groove 45 of nut 9 could be interchanged or could be the same on each nut wherein the same end of the turning tool 33 could be used to manipulate both nuts. Additionally, other specially designed keying arrangements could be used with the nuts; however, in the preferred embodiments, the recessed portion in the nut 7 would always be in its base 13 so that it would be covered when in use (see FIG. 2). The recessed portion in the second nut 9 is shown in the preferred embodiments as being in the top planar surface 21 but it is contemplated that it also could be in the inclined, conical surface 25' as illustrated by groove 45' in FIGS. 8 and 9 or in a combination of the inclined surface 25' and top planar surface 21'.

It is further contemplated that one or both of the nuts 7 and 9 could be easily wired to an existing electric alarm system 61 in the car or other vehicle (see FIG. 11) wherein once set, any rotation of the nut or nuts would activate or set off the alarm system. For example, as shown in FIG. 11, the first nut 7' could have an insulated wire 63 extending through it connected to the electric alarm 61 for the car. Like the nut 7 of FIGS. 4 and 5, the nut 7' is substantially in the shape of a truncated cone with an annular base 13'. However, unlike nut 7, the nut 7' additionally has a protruding portion 65 which is preferably made of insulating material and fits into the hole 43 in the dashboard 3. The electrical contact point 67 of the insulated wire 63 in the embodiment of FIG. 11 then aligns with the insulated portion 69 (see FIG. 13) on the second nut 9''. In operation and with an alarm system that is set off by closing a circuit, any rotation of the nut 9'' beyond the 180 degrees of the insulated portion 69 (see FIG. 13) will bring the point 67 in contact with the metal portion of the nut 9''. This will close the circuit and set off the alarm 61. In an alarm system operated by the breaking of the circuit rather than the closing of one, the nut 9'' in FIG. 11 would simply be rotated 180 degrees to the position of FIG. 14 so that in normal use, a circuit was maintained. However, if the nut 9'' were rotated to a position where the insulated portion 69 covered the contact 67, the circuit would be broken and the alarm 61 set off. FIG. 14 is a further adaptation of the invention in which the electrical wiring is through a special washer 71 wherein the nut 7 of the first embodiment of FIGS. 1–5 can then be used. As shown in FIG. 14, the washer 71 has an annular, protruding portion 73 like the protruding portion 65 of nut 7' that fits into the hole 43 in the dashboard 3 to position the electrical contact 67 next to the nut 9''.

In all of the embodiments, the planar bases of the nuts preferably abut planar surfaces on each of the interior and exterior sides of the dashboard 3. As shown, these planar surfaces can be on members or portions of the dashboard 3 itself such as surface 49 in FIGS. 2 and 3 and surface 51 in FIGS. 11 and 14 or can be planar surfaces on members such as the planar surface 51' on the face plate 52 in FIGS. 2 and 3. Additionally, the planar surfaces abutting the bases of the nuts could be on other members such as conventional washers or special washers such as 71 in FIG. 14. However, in all of the preferred embodiments, the dashboard 3 has interior and exterior sides adjacent the nuts and whether provided by the dashboard 3 itself, face plates, washers, or the like, the interior and exterior sides of the dashboard 3 present substantially parallel and planar surfaces on its interior and exterior sides against which the bases of the nuts can be tightened into abutting relationships for security and strength.

I claim:

1. A theft prevention device primarily intended for use with automotive audio equipment such as radios and tape players in which the audio equipment has at least one mounting bolt that is threaded and extends through a hole in the dashboard of the automobile or other vehicle, said dashboard having interior and exterior sides with respective members having first and second substantially parallel and planar surfaces through which said hole extends, the theft prevention device including:
a pair of threaded nuts, each of said nuts being substantially in the overall shape of a truncated cone with a top, base, and substantially conical exterior surface extending between the top and base, the threads of each nut extending interiorly of the nut from the top to the base and the base of each nut having a substantially planar and annular surface, each of said nuts having a recessed portion therein to receive key means for rotating the nut onto the threaded bolt of said audio equipment, the recessed portion of the first of said nuts being in the base thereof and the recessed portion of the second nut being in at least one of the top of the second nut and the exterior conical surface thereof wherein said first nut can be rotated onto said bolt to a first position, said audio equipment can be manipulated to extend said bolt through the hole in said dashboard with the planar base of said first nut facing the first planar surface of said dashboard, and said second nut can be rotated onto said bolt with the planar base of said second nut facing the second planar surface of said dashboard to draw the planar base of said first nut into an abutting relationship with said first planar surface of said dashboard to cover the recessed portion thereof and to draw the planar base of said second nut into an abutting relationship with the second planar surface of said dashboard.

2. The theft prevention device of claim 1 wherein the pitches of the threads of the nuts are different from the pitch of the threads on the bolt of the audio equipment wherein the nuts are self-locking on the bolt.

3. The theft prevention device of claim 1 wherein the recessed portion of said second nut is in the top thereof.

4. The theft prevention device of claim 3 wherein the second nut has an axis and the recessed portion therein is a non-circular groove extending substantially about said axis.

5. The theft prevention device of claim 4 wherein the depth of said non-circular groove varies about the axis of said second nut.

6. The theft prevention device of claim 1 wherein the recessed portion of said second nut is in the exterior conical surface thereof.

7. The theft prevention device of claim 6 wherein the second nut has an axis and the recessed portion therein is a non-circular groove extending substantially about said axis.

8. The theft prevention device of claim 7 wherein the depth of said non-circular groove varies about the axis of said second nut.

9. The theft prevention device of claim 1 wherein each nut has an axis and the top of each nut is a substantially planar and annular surface extending about and substantially perpendicular to the respective axis of each nut and the recessed portion of said second nut is in the top thereof.

10. The theft prevention device of claim 1 wherein at least one of the first and second planar surfaces is on a face plate member mounted about said bolt.

11. The theft prevention device of claim wherein at least one of the first and second planar surfaces is on a washer member mounted about said bolt.

12. The theft prevention device of claim 1 wherein at least one of the first and second planar surfaces is on a dashboard member extending about said hole.

13. The theft prevention device of claim 1 further including an electric alarm system and means for electrically connecting at least one of said nuts to said system whereby any rotation of said at least one nut relative to said bolt will set off the electric alarm system.

14. The theft prevention device of claim 13 wherein one of said first and second nuts has a portion protruding outwardly of the base of the nut and receivable within the hole in said dashboard and said electrical connecting means includes an electrical contact extending through said protruding portion to contact the other of said nuts.

15. The theft prevention device of claim 13 further including a washer with a protruding, annular portion receivable within the hole in said dashboard and said electrical connecting means includes an electrical contact extending through said protruding portion to contact at least one of said nuts.

16. The theft prevention device of claim 13 wherein each of said nuts has an axis and at least one of said nuts has an electrically insulating portion extending at least partly about the axis of said one nut.

17. The theft prevention device of claim 16 wherein each nut has an electrically insulating portion extending at least partly about each respective nut axis.

18. A theft prevention method primarily intended for use with automotive audio equipment such as radios and tape players in which the audio equipment has at least one mounting bolt that is threaded and extends through a hole in the dashboard of the automobile or other vehicle, said dashboard having interior and exterior sides with respective members having first and second substantially parallel and planar surface through which said hole extends, said method including the steps of:
  (a) providing a pair of threaded nuts, each of said nuts being substantially in the overall shape of a truncated cone with a top, base, and substantially conical exterior surface extending between the top and base, the threads of each nut extending interiorly of the nut from the top to the base and the base of each nut having a substantially planar and annular surface, each of said nuts having a recessed portion therein, the recessed portion of the first of said nuts being in the base thereof and the recessed portion of the second nut being in at least one of the top of the second nut and the exterior conical surface thereof,
  (b) providing key means respectively receivable in the recessed portions of each of said first and second nuts,
  (c) threading said first nut onto the bolt of said audio equipment with said key means,
  (d) manipulating said audio equipment to extend the bolt thereof through the hole in said dashboard with the planar base of said first nut facing the first planar surface of said dashboard,
  (e) threading said second nut onto the bolt of said audio equipment with said key means with the planar base of said second nut facing the second planar surface of said dashboard, and
  (f) continuing to thread said second nut onto said bolt with said key means to draw the planar base of said first nut into an abutting relationship with said first planar surface of said dashboard to cover the recessed portion thereof and to draw the planar base of said second nut into an abutting relationship with the second planar surface of said dashboard.

19. The method of claim 18 further including the step of providing an electric alarm system and electrically connecting at least one of said nuts to said system whereby any rotation of said at least one nut relation to said bolt will set off the electric alarm system.

20. A theft prevention device primarily intended for use with automotive audio equipment such as radios and tape players in which the audio equipment has at least one mounting bolt that is threaded and extends through a hole in the dashboard of the automobile or other vehicle, said theft prevention device including:
  first and second threaded nuts, each of said nuts having an axis and a top and base spaced from each other along said axis with a substantially conical, exterior surface extending about and along said axis between the top and base, said exterior conical surface being inclined inwardly toward said axis from said base toward said top, the threads of each nut extending interiorly of the nut along and about the axis thereof from the top to the base and the base of each nut being a substantially planar and annular surface extending about and substantially perpendicular to the axis of the nut,
  each of said nuts further including a recessed portion, said recessed portion in said first nut being in the base thereof and the recessed portion in said second nut being in at least one of the top of said second nut and the exterior conical surface thereof, and
  said theft prevention device further including key means selectively receivable in the recessed portion of the base of said first nut for threading said first nut onto said threaded bolt of said audio equipment and selectively receivable in the recessed portion of the one of said top and exterior conical surface of said second nut for threading said second nut onto said threaded bolt of said audio equipment wherein said dashboard has interior and exterior sides with respective members having first and second substantially parallel and planar surfaces facing in opposite directions with said hole therethrough extending between the first and second planar surfaces and said threaded bolt of said audio equipment being receivable in said hole so that said first nut can be threaded onto said bolt to a first position with said key means, said audio equipment can be manipulated to extend said bolt through the hole in said dashboard with the planar base of said first nut facing the first planar surface of said dashboard, and said second nut can be threaded onto said bolt by said key means with the planar base of said second nut facing the second planar surface of said dashboard to draw the planar base of said first nut into an abutting relationship with said first planar surface of said dashboard to cover the recessed portion thereof and to draw the planar base of said second nut into an abutting relationship with the second planar surface of said dashboard.

21. The theft prevention device of claim 20 wherein the pitches of the threads of the nuts are different from the pitch of the threads on the bolt of the audio equipment wherein the nuts are self-locking on the bolt.

22. The theft prevention device of claim 20 wherein the recessed portion of said second nut is in the top thereof.

23. The theft prevention device of claim 20 wherein the second nut has an axis and the recessed portion therein is a non-circular groove extending substantially about said axis wherein the depth of said non-circular groove varies about the axis of said second nut.

24. The theft prevention device of claim 20 wherein the recessed portion of said second nut is in the exterior conical surface thereof.

25. The theft prevention device of claim 24 wherein the second nut has an axis and the recessed portion therein is a non-circular groove extending substantially about said axis wherein the depth of said non-circular groove varies about the axis of said second nut.

26. The theft prevention device of claim 20 wherein each nut has an axis and the top of each nut is a substantially planar and annular surface extending about and substantially perpendicular to the respective axis of each nut and the recessed portion of said second nut is in the top thereof.

27. The theft prevention device of claim 20 further including an electric alarm system and means for electrically connecting at least one of said nuts to said system whereby any rotation of said at least one nut relative to said bolt will set off the electric alarm system.

28. A theft prevention device including:
a threaded nut, said nut having an axis and a top and base spaced from each other along said axis with a substantially conical, exterior surface extending about and along said axis between the top and base, said exterior conical surface being inclined inwardly toward said axis from said base toward said top, the threads of said nut extending interiorly of the nut along and about the axis thereof and the base of each nut being a substantially planar and annular surface extending about and substantially perpendicular to the axis of the nut, said nut having a recessed portion in at least one of the top, base, and exterior conical surfaces thereof, said recessed portion being a groove extending at least partially about the axis of said nut wherein the depth of said groove extends in a direction substantially parallel to the axis of said nut, and said theft prevention device further includes key means selectively receivable in said groove for threading said nut onto a threaded bolt.

29. The theft prevention device of claim 28 wherein the pitch of the threads of the nut is different from the pitch of the threads on the bolt wherein the nut is self-locking on the bolt.

30. The theft prevention device of claim 28 wherein the groove in said nut is non-circular about said axis and wherein the depth of said non-circular groove varies about the axis of said nut in said direction parallel to the axis of said nut.

31. The theft prevention device of claim 28 wherein the groove is in the top of said nut.

32. The theft prevention device of claim 28 wherein the groove is in the exterior conical surface of said nut.

33. The theft prevention device of claim 28 wherein the groove is in the base of said nut.

34. The theft prevention device of claim 28 wherein said groove extends entirely about the axis of said nut to form a closed loop.

35. The theft prevention device of claim 28 wherein the depth of said groove varies about the axis of the nut in said direction parallel to the axis of said nut.

36. The theft prevention device of claim 28 wherein the groove in said nut is non-circular about said axis.

37. The theft prevention device of claim 13 further including a washer with a protruding portion receivable within the hole in said dashboard and said electrical connecting means includes an electrical contact extending through said protruding portion to contact at least one of said nuts.

38. The theft prevention device of claim 13 further including a washer with a protruding portion receivable within the hole in said dashboard.

* * * * *

UNITED STATES PATENT AND TRADEMARK OFFICE
CERTIFICATE OF CORRECTION

PATENT NO. : 4,962,651

DATED : October 16, 1990

INVENTOR(S) : Joyce K. Gibbs

It is certified that error appears in the above-identified patent and that said Letters Patent is hereby corrected as shown below:

In column 6, line 49, in claim 11, after "claim" , --1-- should be inserted.

Signed and Sealed this

Seventh Day of January, 1992

Attest:

HARRY F. MANBECK, JR.

Attesting Officer        Commissioner of Patents and Trademarks